United States Patent
Eck et al.

[11] 3,729,993
[45] May 1, 1973

[54] DIGITAL KNOTMETER AND LOG

[75] Inventors: Calvert F. Eck, Osterville; Howard H. Hill, Pocasset, both of Mass.

[73] Assignee: Datamarine International Inc., Pocasset, Mass.

[22] Filed: Mar. 8, 1971

[21] Appl. No.: 121,869

[52] U.S. Cl. ................................................. 73/181
[51] Int. Cl. ......................................... G01c 21/10
[58] Field of Search ............... 73/181, 194 A, 290 V

[56] References Cited

UNITED STATES PATENTS 3,329,017   7/1967   Yamamoto et al. ............... 73/194 A

*Primary Examiner*—Donald O. Woodiel
*Attorney*—Rich & Ericson

[57] ABSTRACT

A digital knotmeter and log for registering the speed of a boat in knots, and its elapsed distance in terms of the integral of its relative velocity through the water, in which the higher ordered digits of the measurement are independent of the velocity of sound in water and in which the lowest ordered digit is approximated by an internal counter.

10 Claims, 9 Drawing Figures

Patented May 1, 1973

3,729,993

INVENTORS
CALVERT F. ECK
HOWARD H. HILL

BY *Rich & Ericson*
ATTORNEYS

INVENTORS
CALVERT F. ECK
HOWARD H. HILL

BY Rich & Ericson
ATTORNEYS

INVENTORS
CALVERT F. ECK
HOWARD H. HILL

BY [signature]
ATTORNEYS

INVENTORS
CALVERT F. ECK
HOWARD H. HILL

BY *Rich & Ericson*

ATTORNEYS

Patented May 1, 1973

INVENTORS
CALVERT F. ECK
HOWARD H. HILL

BY *Rich & Ericson*

ATTORNEYS

DIGITAL KNOTMETER AND LOG

Our invention relates to the art of measuring the relative speed of a vessel in water, and to integrating its speed to determine distance traveled as a function of the measured velocity.

Navigation and piloting frequently require an indication of boat speed that has been obtained in the past by numerous means, as by the conventional taffrail log, or by various devices which rely upon a rotating member whose angular velocity is a function of the relative velocity through the water. The taffrail log is notoriously inaccurate. Devices relying upon rotating vanes or impellers can be made reasonably accurate under fixed conditions of water temperature and salinity, but require a seal between the rotor and the internal parts which may be more or less frictionally loaded in dependence on corrosion, silting, temperature and other variables. Moreover, unless constantly observed, such devices inevitably accumulate seaweed, algae, barnacles and other debris which change their calibration. Other speed measuring devices have been proposed in which the difference in propagation time between acoustic pulses travelling in opposite directions is measured as a measure of the relative speed between an object and a fluid in which it is moving. Such a device is shown in U.S. Pat. No. 3,329,017 to Yamamoto, et al. However, the relative speed of a vessel in water is such that the time taken to complete an accurate measurement by prior apparatus of this type is too long for the purposes of practical piloting and navigation. The object of our invention is to facilitate the rapid measurement of the relative velocity of a boat through the water relatively independently of water salinity and temperature, and with minimal interference from seaweed, silt, and other flotsam and jetsam.

The above and other objects of our invention are attained by an acoustic transceiver connected to a skeg affixed to the keel or hull of the boat. The skeg carrys a pair of spaced electro-acoustic transducers that are aligned with the fore and aft direction of the vessel. A timing generator is provided that basically establishes two fixed and equal times. During the first of these time intervals, one of the transducers supplies acoustic pulses that travel through the water to the other transducer at a speed greater or less than the speed of sound through the water by an amount determined by the relative speed of the boat with respect to the water and the direction of motion of the vessel. Each such pulse is used as a counting signal, and, when received by the other transducer, nearly simultaneously re-excites the first transducer to produce another pulse. This action continues throughout the first timing period. For each such transmitted pulse, a plurality of pulses is generated by an oscillator, and the sum of the transmitted pulses and the oscillator pulses is accumulated in a register. During the second timing period established, the procedure is reversed, by which we mean that the transducer formerly receiving acoustic pulses now serves as a transmitter to supply pulses to the other transducer through the water. These pulses, when received re-excite the sending transducer and when generated, trigger the oscillator to produce for each such pulse a predetermined number of following pulses. The transmitted pulses and the oscillator pulses are employed to step the counter in opposite directions, such that the resulting contents of the register represents the difference between the number of pulses transmitted in the direction of water flow and those transmitted against the direction of water flow.

It will be apparent that in general the sequence of oscillator pulses produced after each transmitted pulse will be interrupted at the end of each timing period in such a way that they will provide an approximate measure of the fraction of the time before another transmitted pulse would have been produced. The net result is to approximate the next lowest ordered digit of the speed indication produced by the relative difference between the main pulses.

The timing apparatus establishes a third and fourth timing interval following each first and second interval. In the third such interval, the contents of the register are transferred to a digital speed display which preferably indicates the speed of the vessel to within one-tenth of a knot. During the fourth timing interval, the contents of the register are emptied into an accumulator through a divider circuit. The accumulator is provided with an indicator that registers the elapsed distance travelled by the vessel over as large a distance as it is desired to provide for indication. The accumulator contents are determined as the approximate integral of the registered speed as a function of time, in which the time increments correspond to the intervals between measurements.

The manner in which the apparatus of our invention is constructed, and its mode of operation, will best be understood in the light of the following detailed description, together with the accompanying drawings, of a preferred embodiment thereof.

Figure 4:
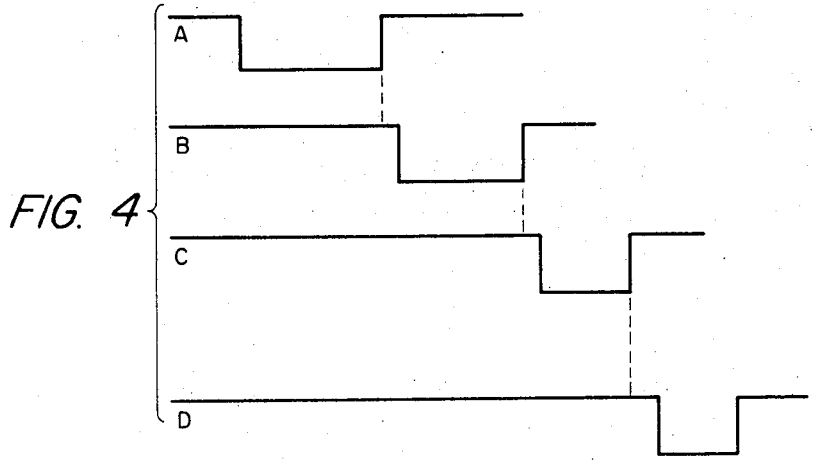
Figure 5:
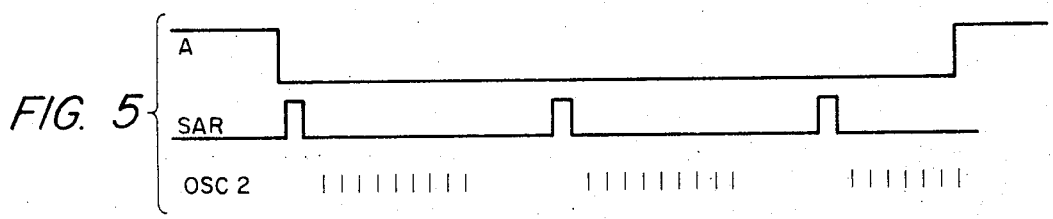
Figure 6:
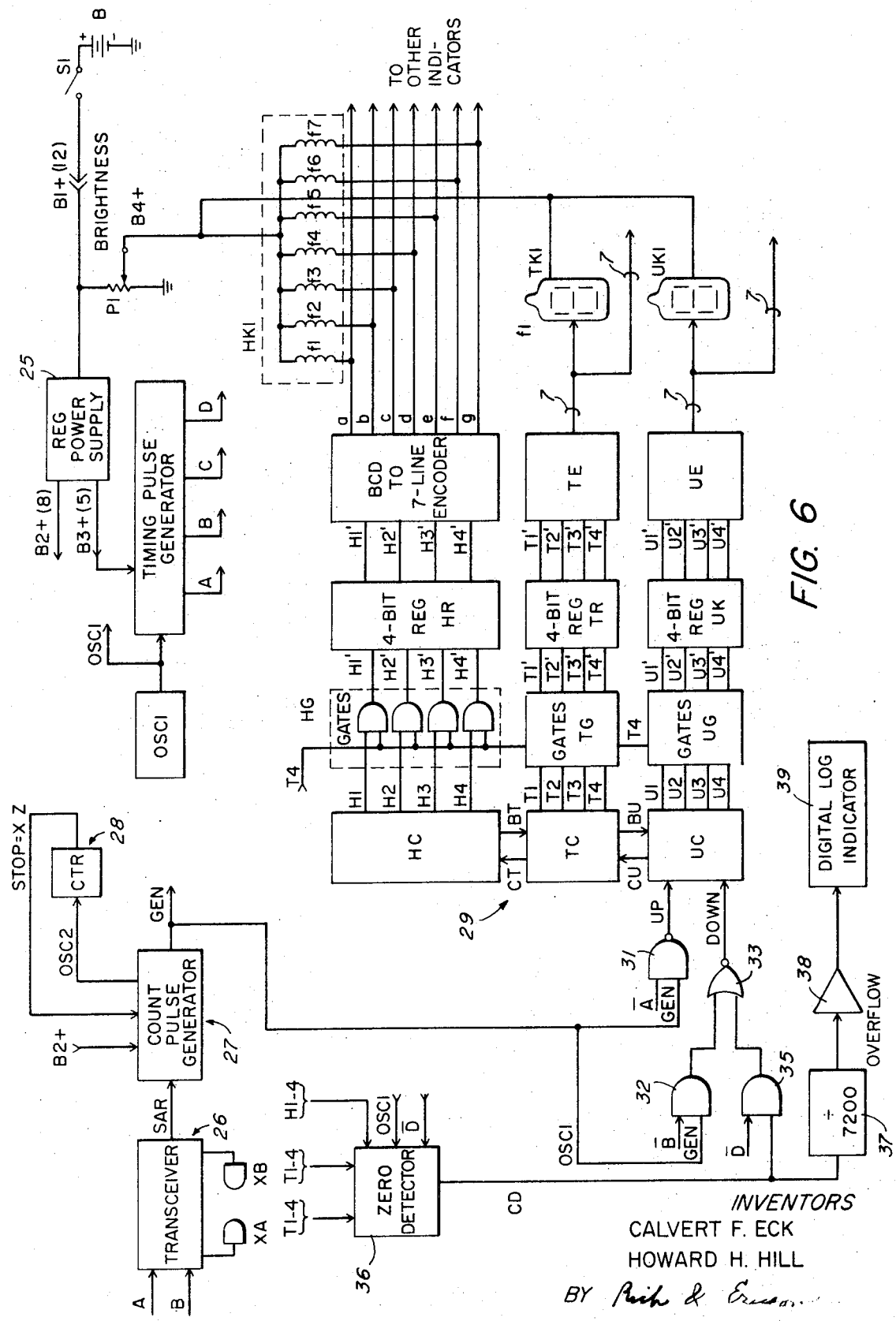
Figure 7:
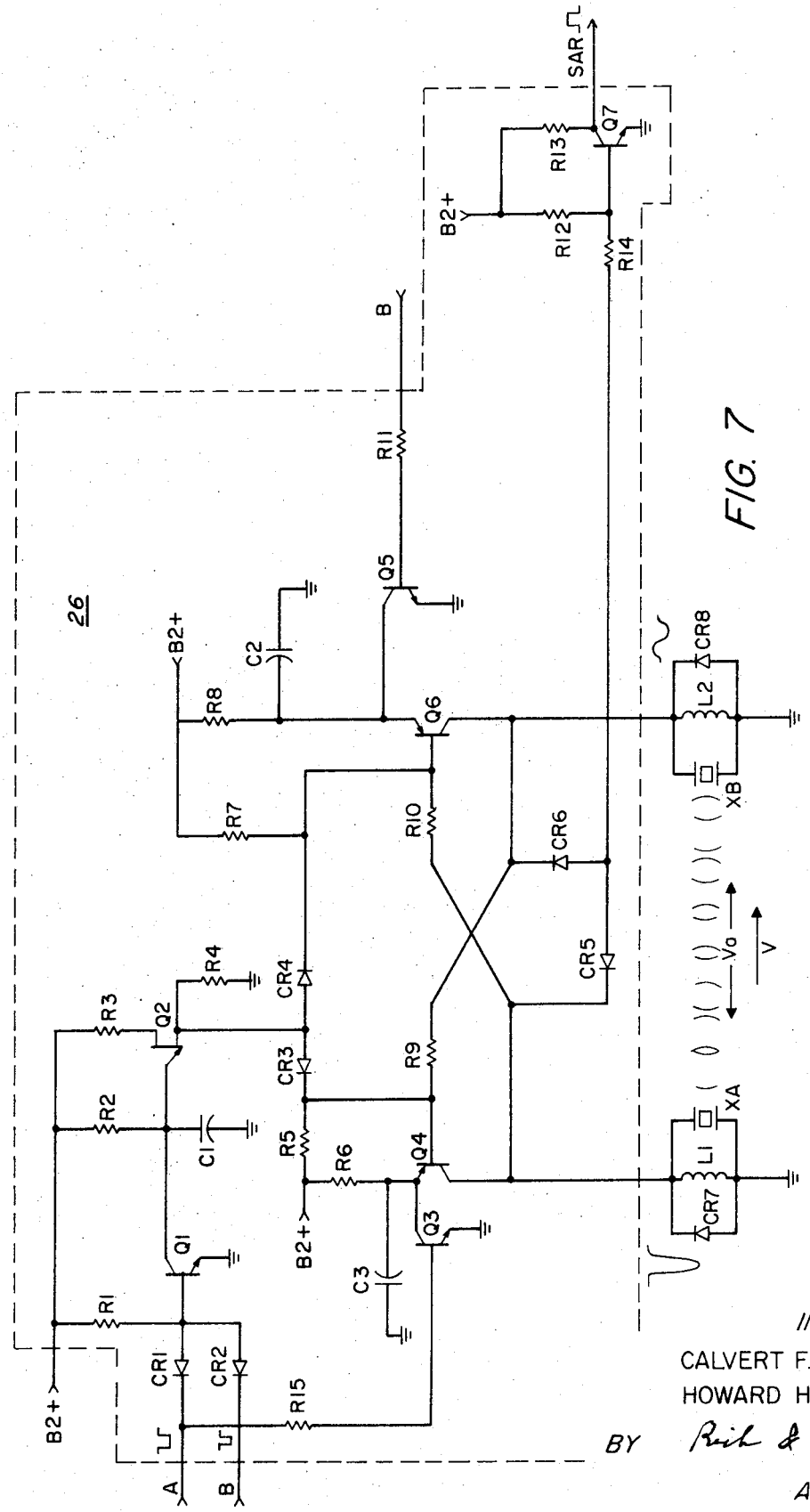
Figure 8:
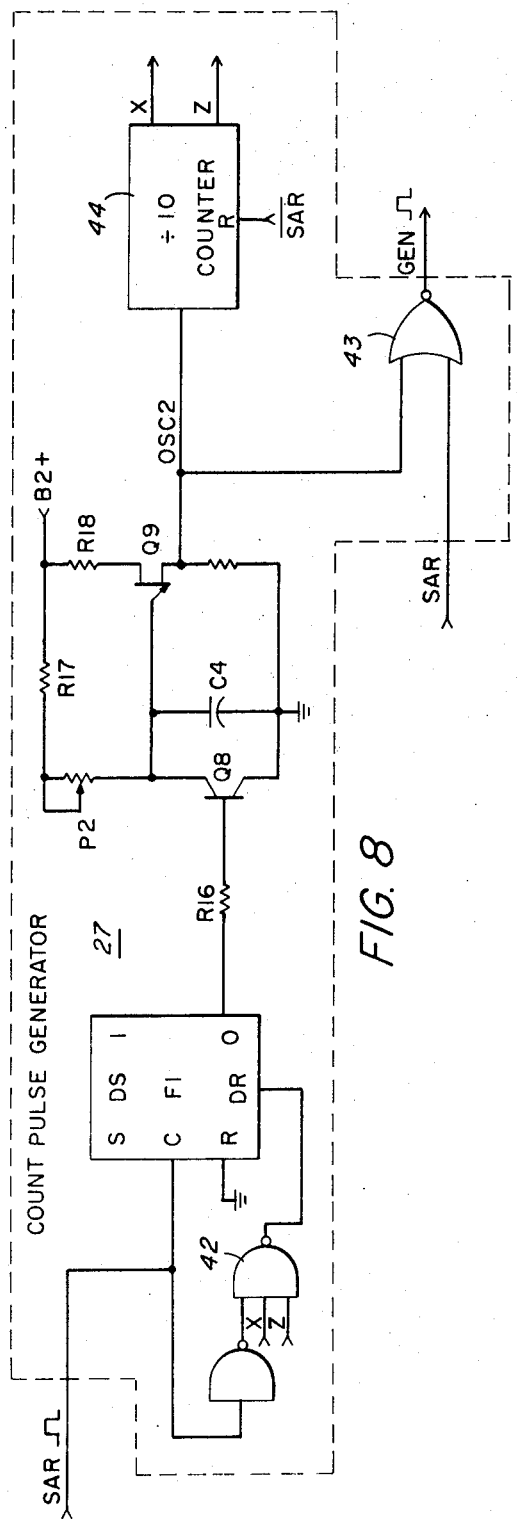
Figure 9:
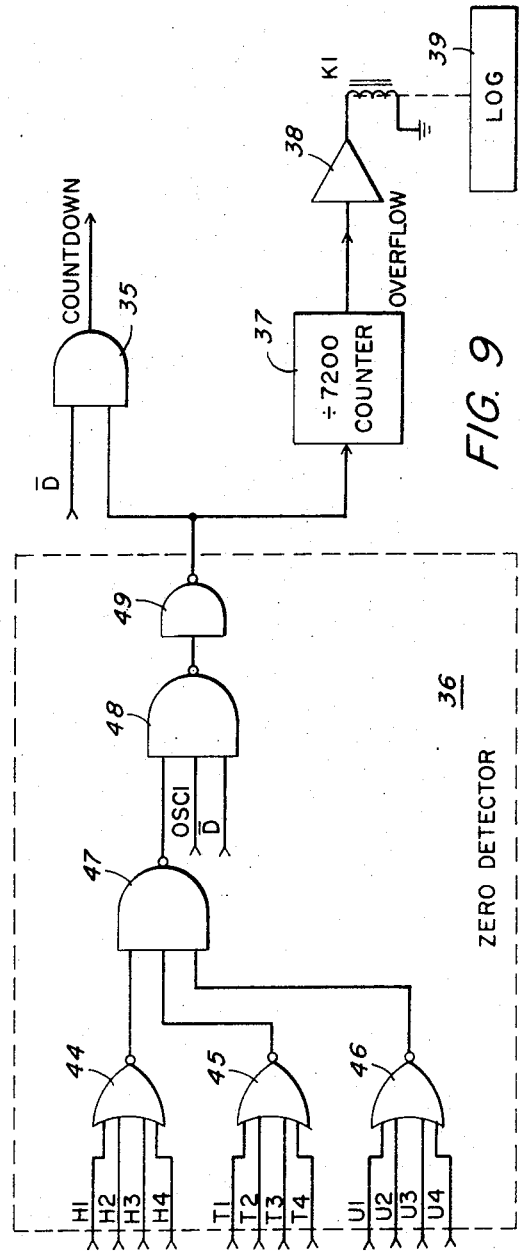

FIG. 4 comprises a schematic timing diagram illustrating various timing pulses controlling the apparatus of our invention;

FIG. 5 is a schematic diagram illustrating typical pulses occurring during the operation of the apparatus of our invention;

FIG. 6 is a schematic block and wiring diagram of the speed and distance measuring apparatus of our invention in accordance with a specific embodiment thereof;

FIG. 7 is a schematic diagram of a transceiver forming a part of the apparatus of FIG. 6;

FIG. 8 is a schematic diagram of a count pulse generator forming a part of the apparatus of our invention; and FIG. 9 is a schematic block and wiring diagram of a log control in accordance with a particular embodiment of our invention.

Figure 1:
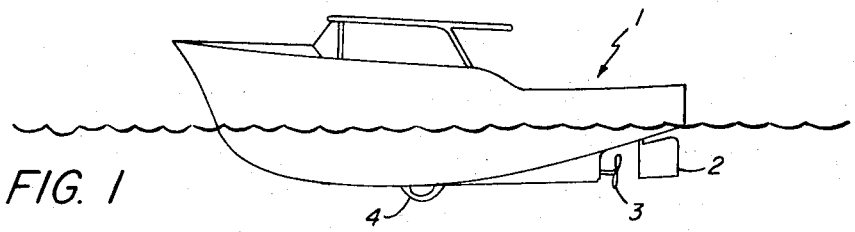
FIG. 1 is a schematic diagram of a boat equipped with the speed measuring apparatus of our invention.
Figure 2:
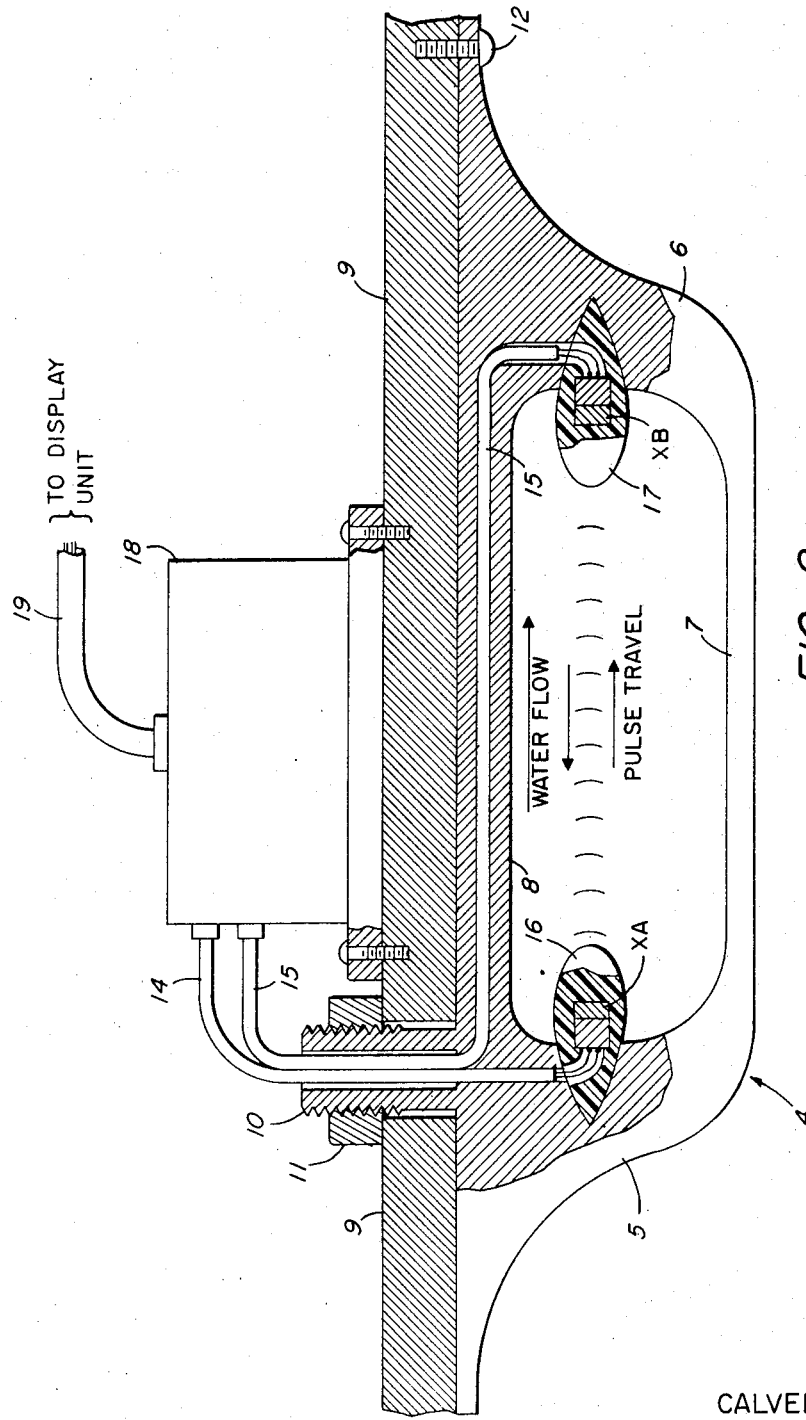
FIG. 2 is a schematic elevational view, on an enlarged scale, showing a portion of the skeg and transducers in their relation to the hull of a boat equipped with the apparatus of our invention.

Referring first to FIG. 1, we have shown a boat generally designated 1 having a conventional rudder 2 ahead of which is mounted a propeller 3. A skeg 4 is mounted preferably well forward of the propeller 3 so as to be as well isolated as possible from the acoustic noise generated by the propeller. The skeg itself is best shown in FIG. 2, and, as indicated, is provided with fairings 5 and 6 interconnected by a bottom plate 7 and a top plate 8 all stream-lined to present minimum resistance to the flow of water past the hull. The skeg 4 is mounted to the hull 9 of the boat by means here shown as a through bolt 10 secured by a nut 11, and in the after portion by means such as a screw 12. Cables 14 and 15 pass through the bolt 10 through sealed passages in the skeg 4 for connection to electro-acoustic transducers XA and XB, respectively, which are in turn embedded in sealed fairings 16 and 17, respectively. The parts of the skeg 4 and the fairings 16 and 17 may be of plastic, such as an epoxy resin or the like, preferably of any conventional variety so treated as to resist corrosion and the accumulation of marine life such as seaweed, algae, barnacles and the like. The electrical terminals of the crystals XA and XB are brought up through the associated cables 14 and 15 to a housing 18 which contains electronic circuitry for sending and receiving pulses through the water, either by exciting the transducer XA such that a pulse will be received at XB, or by exciting the transducer XB so that a pulse will be received by the transducer XA. The housing 18 and the electronics contained therein are preferably designed for short leads and short time constants such that the electronic propagation time between a signal received at one of the transducers such as XB and the repropagated signal responsive to that received signal transmitted to the other transducer such as XA is minimized. In addition, care should be taken to minimize the difference in the time in which a signal received at XB is acknowledged at XA, and vice-versa. A cable 19 leads to a display unit; the propagation time through this cable is not critical.

Figure 3:
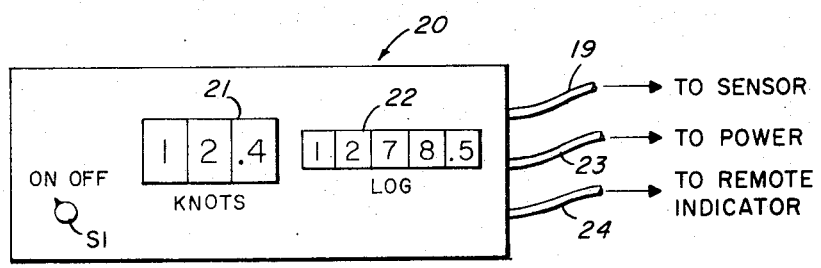
FIG. 3 is a schematic diagram of the indicator panel provided for the use of the operator of the apparatus of our invention.

Referring to FIG. 3, the cable 19 leads to a display indicator generally designated 20 provided with an on/off switch S1, a three-digit knot indicator 21, and a decimal log indicator. As here shown, the log is provided with four digit indications ahead of the decimal point and one digital indication after the decimal point, so that it can produce a maximum indication in knots of 9999.9. The indicator 21 can produce a decimal indication to within one-tenth of a knot that will normally not exceed, for example, 40 knots, although, of course, its capacity is greater than that.

The indicator unit 20 is provided with a cable 23, leading to the vessel's power supply in a manner that will appear in somewhat more detail below, and, if desired, with a cable 24 leading to one or more remote indicators which may be similar to the unit 20, or may simply include the on/off switch and knots indicator features, as in one practical embodiment of our invention.

The apparatus of our invention basically functions on a timing cycle that is indicated in FIG. 4. By conventional means, a timing pulse A is generated which is followed after a brief interval by a timing pulse B of exactly the same duration as the timing pulse A. These pulses may be produced in a conventional manner by a crystal controlled oscillator that will be discussed in somewhat more detail below. By similar conventional means, a timing pulse C is provided following the pulse B by a brief interval, and a timing pulse D is provided following the timing pulse C. The cycle is then repeated with another A pulse. By conventional means, which it is considered unnecessary to describe in detail, these timing pulses are inverted where required, and in those instances are shown and described as $\overline{A}$, $\overline{B}$, $\overline{C}$ and $\overline{D}$, respectively.

Referring next to FIG. 5, the A pulse has been elongated to indicate a typical sequence of operations. During the A pulse, the transducer XA is selected and excited with a pulse SAR that is propagated toward the transducer XB with a velocity that will be assumed to be $V_a + V_c$, where $V_c$ is the speed of sound, assuming water flow $V_a$ in a direction indicated by the arrow in FIG. 2. As will appear, receipt of this pulse by XB will cause XA to emit another pulse, so that a second SAR pulse will be produced when the pulse is received by the transducer XB. Typically, the transducers XA and XB may be spaced so that propagation time between them in still water is about 140 microseconds.

By means to be described, following each SAR pulse there is internally generated a sequence of nine pulses labelled OSC2 in FIG. 5 at such a rate that all nine will be received before the next SAR pulse is produced, in either direction of propagation, under the most extreme conditions of salinity and temperature to be encountered. As indicated in FIG. 5, in general the end of the A pulse will occur at some point during the propagation of the nine OSC2 pulses following the last SAR pulse. The total number of SAR and OSC2 pulses thus produced during an A pulse, to be labelled hereinafter as GEN, is thus at least approximately equal to the number of SAR pulses received to the nearest one-tenth of an SAR pulse.

As will appear, during the B interval shown in FIG. 4, exactly the same operation takes place as indicated in FIG. 5, except that in this case the transducer XB acts as the pulse receiver. In this case, the transmitted pulses are propagated through the water at a speed $V_c - V_a$, so that the total count during a B pulse will be less than the total count produced during an A pulse, supposing the boat, as in FIG. 1, to be moving forward in the water.

As will appear, the pulses produced during the A time are supplied to an accumulator constituting a reversible counter, and each pulse produced during the succeeding B time is subtracted from the accumulator so that at the end of an A pulse and a B pulse the contents of the accumulator represent the speed of the boat through the water. It should be noted in this regard that, because of the residual contents of the accumulator represent the difference between the number of pulses transmitted in opposite directions, it is immaterial whether the SAR pulses are counted as they are transmitted, or as they are received. The independance of the pulse difference so detected on water temperature salinity can be shown mathematically as follows:

Let the transit time in the direction of the flow be given by $t_1$, where $$t_1 = d/(V_a + V_c),$$

in which $d$ is the effective distance between the transducers, $V_a$ is the speed of the boat, and $V_c$ is the speed of sound in water under the prevailing conditions. Then $t_2$, the transit time in the opposite direction, will be given by $$t_2 = d/(V_c - V_a)$$

If the equal times A and B are expressed as $T$, then the number $N1$ of SAR pulses transmitted in A time is given by $$N1 = T/t_1$$

and the number $N2$ of SAR pulses transmitted in B time is given by $$N2 = T/t_2$$

Let $N_3 = N_1 - N_2$, where $N_3$ is the difference in the number of SAR pulses transmitted in A time and B time. Then $$N_3 = N_1 - N_2 = \frac{T}{t_1} - \frac{T}{t_2} = \frac{T}{\frac{d}{V_a + v_c}} - \frac{T}{\frac{d}{V_c - V_a}}$$

or $N_3 = (2TVa)/d$; that is, the accumulated number of counts is independent of the speed of sound in water.

Referring next to FIG. 6, we have shown the apparatus of our invention in somewhat more detail, with certain elements shown in block diagram form. As indicated, power is supplied by a conventional battery B and is effective to cause operation of the apparatus when the switch S1, shown also in FIG. 3, is closed. A potential $B_1 +$, of for example 12 volts, is thereby produced. This voltage is supplied to a conventional regulated power supply 25 that produces a pair of regulated voltages of $B_2+$, of, for example, of 5 volts.

The potential $B_1+$ is also supplied to a brightness control here schematically shown as a potentiometer P1 that supplies an adjustable illuminating voltage $B_4+$ to a series of decimal indicating tubes HK1, TK1, and UK1, which indicate the tens, units, and tenths units respectively, of the registered speed in a manner to appear. Each of these tubes is provided with seven conventional filaments F1 through F7, as shown for the tube HK1. These filaments are arranged in a rectangular conventional array, as better suggested schematically for the tubes TK1 and UK1, to be selectively illuminated in a manner familiar to those skilled in the art so that decimal units from zero to nine can be displayed by selective energization of the filaments.

As indicated, for the tube HK1, any particular filament can be energized by applying a ground level current sink to its associated input terminal $a$ through $g$. The apparatus for providing appropriate energizing signals to these indicating tubes, which it will be appreciated are located behind the panel 21 in FIG. 3, will next be described.

Basic timing for the apparatus is provided by a crystal controlled oscillator OSC1, which may be of, for example, 200 HZ in Frequency, and which is preferably adjustable for calibration purposes. In particular, since the speed indication provided is determined by the difference between the number of pulses propagated during A time and the number propagated during B time, the oscillator OSC1 should be adjusted so that the resulting difference will be a direct measure of the speed in the desired units; i.e., knots, m.p.h., etc.

The output signal, labelled OSC1, is employed to actuate the log forming a part of our invention, as will be described, and is also directly connected to a conventional timing pulse generator that produces the pulses A, B, C and D described above, on independent leads, and in the sequence shown in FIG. 4, by conventional pulse dividing the gating circuits which it is though unnecessary to describe in detail. The power supply potential $B_3 +$ is supplied to the timing pulse generator such that each of the pulse signals $\overline{A}, \overline{B}, \overline{C}$, and $\overline{D}$ is at $B_3 +$, or 5 volts, when it is present, and is at 0 volts, or ground potential, when it is not present. These polarities are, of course, a matter of choice or design, but are included to facilitate an understanding of the invention.

The apparatus further includes a transceiver generally designated 26 contained within the housing 18 in FIG. 2 and connected to the transducers XA and XB in a manner to be described below such that SAR pulses are produced during the time period A, in response to pulses propagated from XA to XB. Similar pulses, SAR are produced during the period B when the pulses are propagated from XB to XA.

These pulses SAR are supplied to a count pulse generator generally designated 27. The count pulse generator 27 is also supplied with a power supply voltage $B_2+$, and a STOP signal labelled STOP from a counter 28 in response to each ninth pulse OSC2 produced by the count pulse generator 27 in a manner to be described.

The count pulse generator produces an output signal labelled GEN and comprising pulse trains of the type shown in FIG. 5 which include both the pulses SAR and the following pulses OSC2. These pulses GEN are applied to a reversible binary coded decimal counter generally designated 29 and comprising a 4 bit reversible unit counter stage UC, a 4 bit ten's counter stage TC, and a 4 bit hundred's counter stage HC. The counter stage UC is connected to the counter stage TC in a conventional manner by a carry line CU and a borrow line BU. Similarly, the ten's stage TC is connected to the hundred's stage HC by carry line CT and borrow line BT. These circuits may be conventional and they need not be described in further detail.

The counter 29 is stepped up or down by logic 0 pulses applied either to its up or down lines. During the A time, pulses GEN are supplied through a NAND gate 31 to cause the counter 29 to count up. During B time, the pulses GEN are supplied through an AND gate 32 followed by a NOR gate 33 to cause the counter to step down. The preferred frequency of counting is such that somewhat more than 14,000 GEN pulses will be supplied to the counter during A time and somewhat less than 14,000 pulses will be supplied during B time. The counter will obviously overflow a number of times during each A and B pulse. However, in accordance with our invention, the number to be measured, which is the difference between the pulses supplied during the A time and the B time, will always be in the last three digits. Thus, it is not necessary to register or take account of these overflow conditions.

The binary coded decimal outputs of the counter stages TC, UC and HC labelled, for example, H1, H2, H3, and H4 for the counter stage HC, are strobed at T4 time into a 4 bit tens register HR, a 4 bit units register TR, and a 4 bit tenths register UR through gates labelled HG, TG and UG, respectively. As indicated, these gates may be simply AND gates of the type shown at 34 in the unit HG. Once stored in the registers, HR, TR, and UR, the signals, which now will be the difference in count between the last preceding A and B pulses, are supplied through conventional binary-coded-decimal-to-7-line encoders HE, TE and UE, to supply appropriate energizing signals to the indicating lamps HK1, TK1 and UK1, to indicate the tens, units, and tenths digits of the speed of the vessel in knots.

During the time pulse D, the contents of the counter 29 are progressively reduced to zero by pulses from the oscillator OSC1 supplied through an AND gate 35 enabled by the pulse D as one input to a NOR gate 33 to count down the counter until a zero detector generally designated 36 indicates that the contents of each of the registers UC, TC and HC has been reduced to zero. The count down pulses CD from the zero detector 36 are supplied both to the AND gate 35 and to a counter 37. The counter 37 divides the number of pulses by 7200 and supplies an overflow pulse through an amplifier generally designated 38 to a mechanically actuated digital log indicator generally designated 39 that displays the accumulated integral of the measured speed of the craft in knots, or, if desired, in statute miles or other convenient units. The number 7200 is selected in terms of the approximation to the integral $D = \int v dt$ that is determined by the increments $\Delta t$ between the measurements of $v$ so that the output represents the elapsed distance D in nautical miles, or other desired units.

FIG. 7 shows the details of the transceiver 26 in accordance with a preferred embodiment of the invention. The transceiver 26 is normally disabled by an n-p-n transistor Q1 that has its base connected to receive the signal A through a diode CR1, and, in parallel, to receive the signal B through a diode CR2. When both of these signals is absent, there is a +5 volt potential applied to block the diodes CR1 and CR2 and thereby allow the transistor Q1 to be forward biased through a resistor R1 connected between its base and the supply voltage B2+. That shunts a capacitor C1 in a unijunction transistor circuit comprising a unijunction transistor Q2 having its emitter connected between one terminal of the capacitor C1 and ground. A timing resistor R2 is connected between the emitter of the transistor Q2 and the supply terminal B2+.

One base of the transistor Q2 is returned to the supply terminal B2+ through a resistor R3, and its second base is returned to ground through a resistor R4.

It will be apparent that when either of the timing signals A or B is present at ground potential, a ground level sink is supplied through the diode CR1 or CR2 to cut off the transistor Q1 and allow the capacitor C1 to charge through the resistor R2. The unijunction transistor Q2 will thereby be biased into conduction, producing a pulse across the resistor R4 that is initially positive going and decays to a lower constant positive value, to present a pulse signal allowing the selected one of the piezo-electric crystals XA or XB to be excited in a manner that will next be described.

The input signal A is applied through a resistor R15 to the base of an npn transistor Q3 that has its emitter grounded. The collector of the transistor Q3 is returned to B2+ through a resistor R6, and is connected to ground through a capacitor C3. The collector of the transistor Q3 is also connected to the emitter of a pnp transistor Q4 that has its collector connected to a circuit extending from the collector of the transistor Q4 through the piezo-electric crystal XA to ground, and in parallel with the crystal, through an inductor L1 and protective diode CR7. A first circuit is coupled to the base of the transistor Q4 from the second base of the unijunction transistor Q2 through a diode CR3. The second base of the transistor Q2 is also connected through the diode CR3 and a resistor R5 to the supply terminal B2+. A second control circuit for the base of the transistor Q4 extends from the upper terminal of a parallel circuit including the piezo-electric crystal XB, an inductor L2, and a protective diode CR8. This circuit extends from the upper terminal of the inductor L2 through a resistor R9 to the base of the transistor Q4.

Transistors Q5 and Q6 are connected in a circuit essentially symmetrical with that comprising the transistors Q3 and Q4 for the control of the crystal XB. As shown, when the signal B is absent, a positive voltage is supplied through the resistor R11 to the base of an npn transistor Q5, biasing it into conduction and bringing the emitter of a pnp transistor Q6 essentially to ground potential. The emitter of the transistor Q6 is connected to the positive supply terminal B2+ through a resistor R8, and to ground through a storage capacitor C. The collector of the transistor Q6 is connected to ground through the parallel circuit comprising the crystal XB, the inductor L2 and the protective diode CR8.

The collector of the transistor Q6 is also connected to the base of the transistor Q4 through a resistor R9. The base of the transistor Q6 is connected to the collector of the transistor Q4 through a resistor R10, and is connected through a resistor R7 to the supply terminal B2+. The base of the transistor Q6 is also returned to the second base of the unijunction transistor Q2 through a diode CR4.

An output amplifier circuit is provided comprising an npn transistor Q7 having a grounded emitter and a collector returned to the supply terminal B2+ through a resistor R13. The base of the transistor Q7 is connected to B2+ through a resistor R12, and is connected to the anodes of a pair of diodes CR5 and CR6 through a resistor R14. The diodes CR5 and CR6 form an OR gate for pulsing the amplifier comprising the transistor Q7, as will appear.

In the presence of a negative-going current sink applied to the cathode of either of the diodes CR5 or CR6, the potential of the base of the transistor Q7 is reduced. That cuts off the transistor Q7 and produces a positive-going pulse SAR. The manner in which this pulse is produced during the operation of the apparatus will next be considered.

First, assuming that the pulse A is present at ground level to draw current through the resistor R1 and the diode CR1, cutting off the transistor Q1. As the same time, the ground level signal A will be applied through the resistor R15 to cut off the transistor Q3. Prior to the application of the ground level pulse A, capacitor C3 is by-passed by current flowing through the resistor R6, the collector-to-emitter path of the transistor Q3, and through the inductor L1 to ground. In the presence of the pulse A, the transistor Q3 is cut off and the capacitor C3 will be charged.

With the transistor Q1 now cut off, the capacitor C1 will be charged through the resistor R2, and the emitter potential of the unijunction transistor Q2 will rise to the point at which the unijunction will discharge and produce a positive pulse across the resistor R4. While this charging of the capacitor C1 is taking place, current flowing from the potential B2+ through the resistor R6 in the emitter-to-collector path of the slightly forward biased transistor Q4 will flow through the inductor L1.

When the unijunction transistor Q2 does discharge, the positive pulse produced across the resistor R4 will be coupled through the diode CR3 to cut off the transistor Q4 and abruptly interrupt the current through the inductor L1. A sharp negative-going pulse will thereby be applied to the transducer XA, causing a corresponding acoustic pulse to be propagated towards the transducer XB at the velocity of sound in the water under prevailing conditions plus the velocity of the boat in the direction of motion. This pulse will be severely damped in the positive direction by the diode CR7, so that a minimum of ringing will occur.

When this negative signal from the transducer XA, attenuated by some 20 or 30 db, is received by the transducer XB, an inverted and positive-going pulse will be produced across the inductor L2 that will be coupled to the base of the transistor Q4 through the resistor R9, causing it to be momentarily cut off again. Cutting off the transistor Q4 will again interrupt conduction through the inductor L1 and produce another negative pulse across the transducer XA, propagated toward the transducer XB and actuating the amplifier Q4 to produce a second pulse SAR.

In the interval between the pulses A and B, the transistor Q1 will again be gated into conduction and discharge the capacitor C1. When the pulse B appears at ground potential, the capacitor C1 will again change to the firing potential of the unijunction Q2, producing another positive spike decaying to a positive level across the resistor R4. The spike in this case will cut off the transistor Q6, through the diode CR4. In this case, the current through the inductor L2 will be abruptly interrupted, propagating a negative pulse toward the transducer XA against the direction of water flow. At the same time, the potential at the cathode of the diode CR6 will be dropped, turning off the transistor Q7 and producing an SAR pulse. The interval between SAR pulses produced during the B pulse will evidently be longer than the interval between those produced during the A interval, because of the relative direction of water flow.

Referring now to FIG. 8, the details of the count pulse generator in accordance with the preferred embodiment of the invention are shown. The apparatus may comprise a conventional synchronous digital J-K flip-flop F1 which may be assumed to be provided with conventional gated set and reset terminals S and R which respond to an applied logic 0 level when a negative-going clock pulse is applied to a trigger terminal C, and direct set and direct reset input terminals DS and DR which respond to applied logic 0 signal levels to direct the state of the flip-flop independently of the trigger terminal. As shown, the terminal R of the flip-flop F1 is grounded, so that a pulse applied to the clock pulse terminal C will set the flip-flop. When set, the logic 0 output terminal of the flip-flop is at 0 volts, and the logic 1 output terminal is at logic 1, or positive. The flip-flop F1 will accordingly produce a ground level signal at its logic 0 output terminal when set by the negative-going trailing edge of an input pulse SAR from the transceiver described above in connection with FIG. 7. When reset, the flip-flop F1 will apply a positive signal to a resistor R16 to bias a transistor Q8 of the npn variety into conduction. The transistor Q8 has its emitter grounded, and its collector connected to the positive supply terminal B2+ through a calibration potentiometer P2 and a fixed resistor R17 in series. The resistor P2 may be used to calibrate the apparatus for both salinity or temperature or both. Its function will be described in more detail below.

The apparatus 27 comprises a relaxation oscillator formed by a unijunction transistor Q9 having a first base returned to the supply terminal B2+ to a resistor R18 and a second base returned to ground through a resistor R19. The emitter of the unijunction transistor Q9 is connected between the junction of the potentiometer P2 and a capacitor C4. The capacitor C4 is connected between the emitter of the transistor Q9 and ground, and is also connected between the collector and the emitter of the transistor Q8. It will be apparent that when the flip-flop F1 is set, the logic 0 potential appearing at the 0 terminal of the flip-flop F1 will cut off the transistor Q8 and allow the capacitor C4 to be charged, through the resistor R17 and that portion of the potentiometer P2 selected by its setting, until the firing potential of the transistor Q9 is reached, at which point the capacitor C4 will be discharged through the emitter-to-base junction of the transistor Q9 and through the resistor R19 to ground. That will produce a positive OSC2 pulse that is applied to step up a divide-by-10 counter 44, of any conventional binary variety, and to one input terminal of a NOR gate 43.

The counter 44 is provided with two output terminals labelled X and Z which may comprise the logic 1 values of the $2^3$ digit and the $2^0$ digit, respectively, of the counter states, representing the count 9. At this count, the signals X and Z are applied as positive signals to two input terminals of a NAND gate 42. A third input terminal of the NAND gate 42 receives the output of a NAND gate 41 which inverts the received pulse SAR and thereby produces a positive input signal when SAR is absent. The combination of the signals SAR absent and X and Z present will thus produce a logic 0 at the output terminal of the gate 42, resetting the flip-flop F1 and turning off the relaxation oscillator comprising the unijunction transistor Q9. The result will be 9 OSC2 pulses applied to the NOR gate 43, each of which will produce a GEN pulse. The SAR pulse which initially set the flip-flop F1 and triggered the train of 9 OSC2 pulses is also applied to the NOR gate 43 to produce a GEN pulse, such that a train of 9 pulses following each SAR pulse, with the possible exception of the last, is produced, as shown in FIG. 5. These pulses are applied to step the counter 29 in FIG. 6 up or down as determined by the prevailing interval time A or B, respectively.

Referring next to FIG. 9, the details of the zero detector 36 are shown. Basically, this detector comprises three NOR gates 44, 45 and 46 which receive the BCD outputs of the counter stages HC, TC and UC of the counter 29. As long as any one of these signals H1 through U4 is at logic 1, the output of the corresponding gate 44, 45, or 46 will be at logic 0, disabling a NAND gate 47 which receives the outputs of the gates 44, 45 and 46. Under these conditions, the gate 47 will produce a logic 1 output signal, enabling a NAND gate 48 that receives the positive pulses OSC1 and D. The output of the NAND gate 48 produces negative going pulses in response to OSC1 while enabled by the "1" from "zero detection gate" 47 and time interval D. Gate 49 inverts the pulses from gate 48 to provide positive going pulses.

These pulses are applied to gate 35 along with time interval D to count down the accumulator to zero. These pulses are also supplied to the 7200 counter 37 to advance the log. Thus, the gate 35 counts down the contents of the counter 29 until a 0 count is detected. Each count down pulse applied to the gate 35 by the gate 49 is also applied to the dividing counter 37, which overflows at each 7200th count to produce an overflow signal applied through an amplifier 38 to actuate a relay K1 and thereby step a mechanical digital log indicator 39 of any conventional construction.

Overall operation of the apparatus of our invention will be apparent from the general description of the system in FIG. 6 and the detailed description of the several components with respect to FIGS. 7-9. Briefly, when the switch S1 is closed, the transceiver 26 will alternately supply approximately 1400 pulses from the crystal XA to the crystal XB, resulting in SAR pulses that step up the counter 29 during the time interval A. During the time interval B, a lesser number of pulses, still approximately in the vicinity of 1400, will be applied from the transducer XB to the transducer XA, producing somewhat less than 1400 SAR pulses that are applied to step down the counter 29. Following each received pulse SAR in either the count up or count down mode of operation. nine additional pulses are produced by the count pulse generator 27, so that for each received pulse SAR, except perhaps the last, during each interval A and B, there will be 10 pulses counted. Since the difference between the count up and count down sequence will always be less than 1000 counts, overflow of the counter 29, (FIG. 6) is immaterial, as the residual difference will reflect the actual speed. It will be apparent that the accuracy of the instrument will depend upon how nearly the difference between the eighth OSC2 pulse produced by the generator of FIG. 8 and the ninth equals the difference between the ninth pulse and the next SAR pulse. That can be controlled in dependence upon salinity and temperature so that considerable accuracy can be provided under any particular set of conditions. More importantly, it should be noted that the setting of the potentiometer P2, which controls the interval between the pulses OSC2, could be adjusted to reflect the normal conditions under which the particular vessel will be operated. An additional feature of the invention is that even though the exact tenths reading represented by the knotmeter may be affected both by internal electronic propagation time and by local variations in salinity and temperature, the direction of increase or decrease in speed is an invaluable aid in trimming the boat to take advantage of prevailing conditions. In particular, in trimming the sails of a sailboat, if an adjustment results in an increased indication of one-tenth or two-tenths knots, it will be obviously an improvement even if the exact speed reading is off by more than the change in the indication.

While we have described our invention with respect to the details of a preferred embodiment thereof, many changes and variations will be apparent to those skilled in the art upon reading our description, and such can obviously be made without departing from the scope of our invention.

Having thus described our invention, what we claim is:

1. Apparatus for measuring the velocity of an object relative to a fluid in which the object is at least partially immersed comprising a pair of confronting transducers coupled to said object along an axis, means for exciting a first of the transducers to propagate signals along said axis toward the second for a predetermined time interval, means for producing a predetermined number of signals following each propagated signal, reversible accumulator means for accumulating said propagated and produced signals during said time interval, means for exciting said second transducer to propagate signals toward said first transducer for a second time interval equal to said first time interval, means responsive to each signal propagated toward said first transducer for producing said predetermined number of signals, and means for decrementing the contents of said accumulator once for each signal propagated and produced during said second time interval, whereby the residual contents of said accumulator means represents the relative speed of the object along said axis through the fluid.

2. The apparatus of claim 1, including means actuated following each of said second time intervals for indicating the contents of said accumulator.

3. The apparatus of claim 1, further comprising means for accumulating the residual contents of said accumulator over a sequence of said first and second time intervals to provide a measure of distance elapsed by the object through the fluid.

4. A marine speedometer, comprising a skeg mounted on the hull of a vessel beneath the waterline thereof and aligned parallel to the keel of the vessel, a pair of transducers mounted in spaced confronting relationship on said skeg and in alignment therewith, singaround circuit means connected to said transducers and responsive to a first applied signal for propagating a first series of signals from a first of said transducers toward the second at intervals determined by the propagation time of said signals from the first transducer to the second during said first applied signal, said singaround circuit means being responsive to a second applied signal for propagating a second series of signals from said second transducer toward said first transducer at intervals determined by the propagation time of said signals from the said second transducer to said first transducer during said second applied signal, means responsive to said first applied signal and said first propagation signals for generating a train of a predetermined number of signals following each first signal propagated between said transducers, means responsive to said second applied signal and said second propagated signals for generating a train of said predetermined number of signals following each second signal propagated between said transducers, means for alternately applying said first and said second signal to said singaround circuit means for equal time durations, and reversible accumulator means connected to said singaround circuit means and responsive to said first applied signal for registering the number of propagated and generated signals during said first applied signal, said accumulator means being responsive to said second applied signal for decrementing the contents of said accumulator means once for each propagated and generated signal during said second applied signal.

5. The apparatus of claim 4, further comprising
a register,
means actuated following each second signal for transferring the contents of said accumulator to said register, and
indicating means coupled to said register for indicating the speed of the vessel in terms of the contents of said register.

6. The apparatus of claim 5, further comprising
a second register, and
means effective following the transfer of the contents of said accumulator to said first register to add the contents of said accumulator to said second register, thereby providing a measure of elapsed distance, 7. The apparatus of claim 6, in which said addiing means comprises a signal divider to cause the contents of said second register to represent the elapsed distance in predetermined units.

8. In combination with an object at least partially immersed in a fluid and an acoustic flowmeter mounted on said object, said flowmeter being of the type comprising a reversible accumulator, singaround transceiver means coupled to said accumulator for producing signals at a first rate determined by the rate of propagation of sonic signals through the fluid from a first transducer on the object to a second transducer on the object and at a second rate determined by the rate of propagation of sonic signals from said second transducer to said first transducer, said signals being propagated for equal times in said opposite directions and added in the accumulator while propagated in one direction and subtracted from the accumulator while propagated in the opposite direction, that improvement comprising means for producing a train comprising an equal number of signals following each propagated signal and proceding the next, and means for adding or subtracting those produced signals following propagated signals to or from said accumulator during said equal times according as said propagated signals are added or subtracted, respectively whereby the contents of said accumulator following a pair of said equal times represents the relative velocity of said object in said fluid along the line between said transducers more accurately than would the difference between the signals actually propagated during said equal time intervals.

9. In combination with an acoustic flowmeter comprising
a singaround circuit producing a first series of signals propagated at a first rate in a first direction in a fluid in which the flowmeter is at least partially immersed, each succeeding said signal being responsive to its preceding signal, and
a second series of signals propagated at a second rate in a second sense in a direction opposite said first direction in said fluid, in which said first and second rates are determined by the relative velocity of the flowmeter in the fluid along a line parallel to said opposite directions,
a relaxation oscillator responsive to each signal propagated through said medium to produce a signal train,
a counter controlled by said signal train to disable said oscillator prior to the shortest time between propagated pulses,
an accumulator,
means for incrementing said accumulator for a first predetermined time in response to each of said first propagated signals and each signal produced by said oscillator during said first time, and
means for decrementing said accumulator for a second time equal to said first time in response to each of said second propagated signals and each signal produced by said oscillator during said second time.

10. The apparatus of claim 9, further comprising
a register,
a speed indicator controlled by the contents of said register, and
means for copying the contents of said accumulator into said register at the end of each second time.

* * * * *